US008609968B1

(12) United States Patent
Rodriguez

(10) Patent No.: US 8,609,968 B1
(45) Date of Patent: Dec. 17, 2013

(54) SALSA METRONOME

(76) Inventor: Jerry Rodriguez, Cleveland, OH (US)

( * ) Notice: Subject to any disclaimer, the term of this patent is extended or adjusted under 35 U.S.C. 154(b) by 380 days.

(21) Appl. No.: 12/985,973

(22) Filed: Jan. 6, 2011

(51) Int. Cl.
*G09B 15/00* (2006.01)

(52) U.S. Cl.
USPC ................................................ 84/484; 84/453

(58) Field of Classification Search
USPC ........................................................... 84/484
See application file for complete search history.

(56) References Cited

U.S. PATENT DOCUMENTS

| | | | | |
|---|---|---|---|---|
| 3,569,638 | A * | 3/1971 | Schoengold | 381/409 |
| 4,014,167 | A | 3/1977 | Hasegawa et al. | |
| 4,193,257 | A * | 3/1980 | Watkins | 84/484 |
| 4,733,593 | A * | 3/1988 | Rothbart | 84/484 |
| 5,447,089 | A | 9/1995 | Marrash | |
| D378,899 | S | 4/1997 | Ridinger | |
| 5,751,825 | A | 5/1998 | Myers et al. | |
| 5,850,048 | A | 12/1998 | Ruf | |
| 6,462,260 | B2 * | 10/2002 | Fediakov | 84/327 |
| 7,531,734 | B2 | 5/2009 | Kobayashi | |
| 2003/0218957 | A1 * | 11/2003 | Tanishima | 369/75.1 |

* cited by examiner

*Primary Examiner* — Christopher Uhlir

(57) ABSTRACT

A salsa metronome provides a practice rhythm in the style of salsa music to facilitate practice for a musician, singer or dancer. The metronome includes a housing and a control unit positioned in the housing. The control unit produces multiple polyrhythmic sound patterns. A rhythm selection control is coupled to the housing. The rhythm selection control is operationally coupled to the control unit for selecting a desired polyrhythmic sound pattern. A speaker is positioned in the housing and is operationally coupled to the control unit for audibly producing the selected polyrhythmic sound pattern.

1 Claim, 3 Drawing Sheets

SALSA METRONOME

BACKGROUND OF THE DISCLOSURE

Field of the Disclosure

The disclosure relates to metronome devices and more particularly pertains to a new metronome device for providing a practice rhythm in the style of salsa music to facilitate practice for a musician, singer or dancer.

SUMMARY OF THE DISCLOSURE

An embodiment of the disclosure meets the needs presented above by generally comprising a housing and a control unit positioned in the housing. The control unit produces multiple polyrhythmic sound patterns. A rhythm selection control is coupled to the housing. The rhythm selection control is operationally coupled to the control unit for selecting a desired polyrhythmic sound pattern. A speaker is positioned in the housing and is operationally coupled to the control unit for audibly producing the selected polyrhythmic sound pattern.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
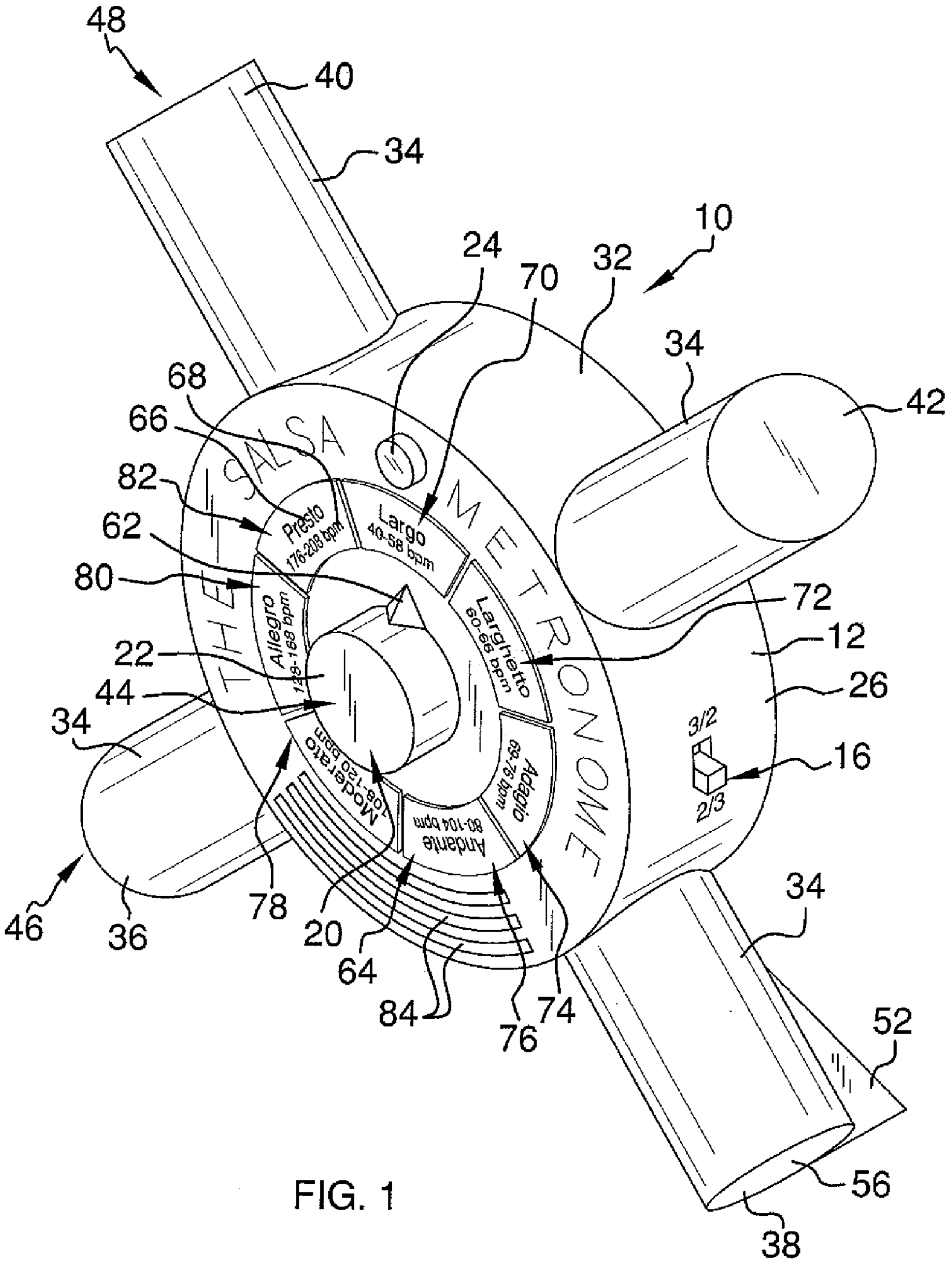
FIG. 1 is a top front side perspective view of a salsa metronome according to an embodiment of the disclosure.
Figure 2:
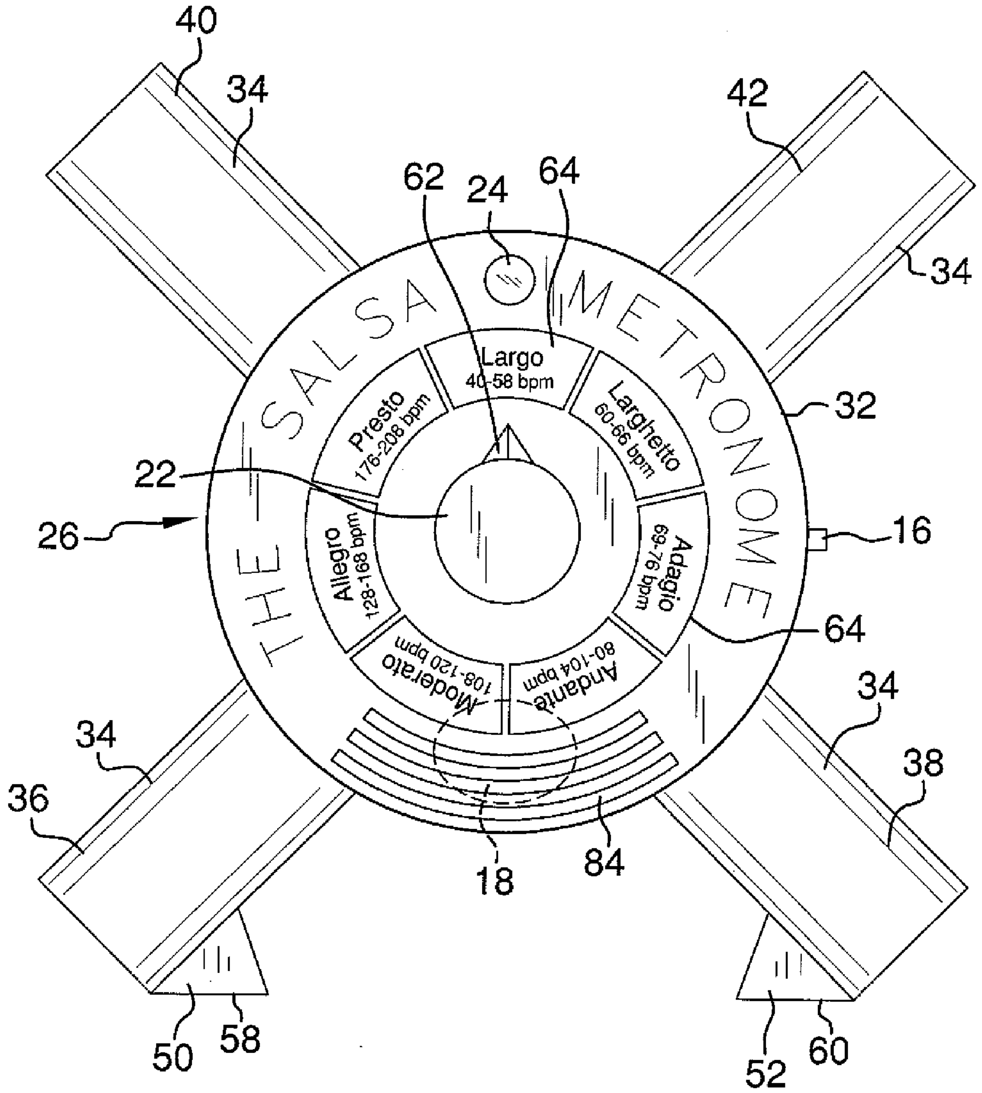
FIG. 2 is a front view of an embodiment of the disclosure.
Figure 3:
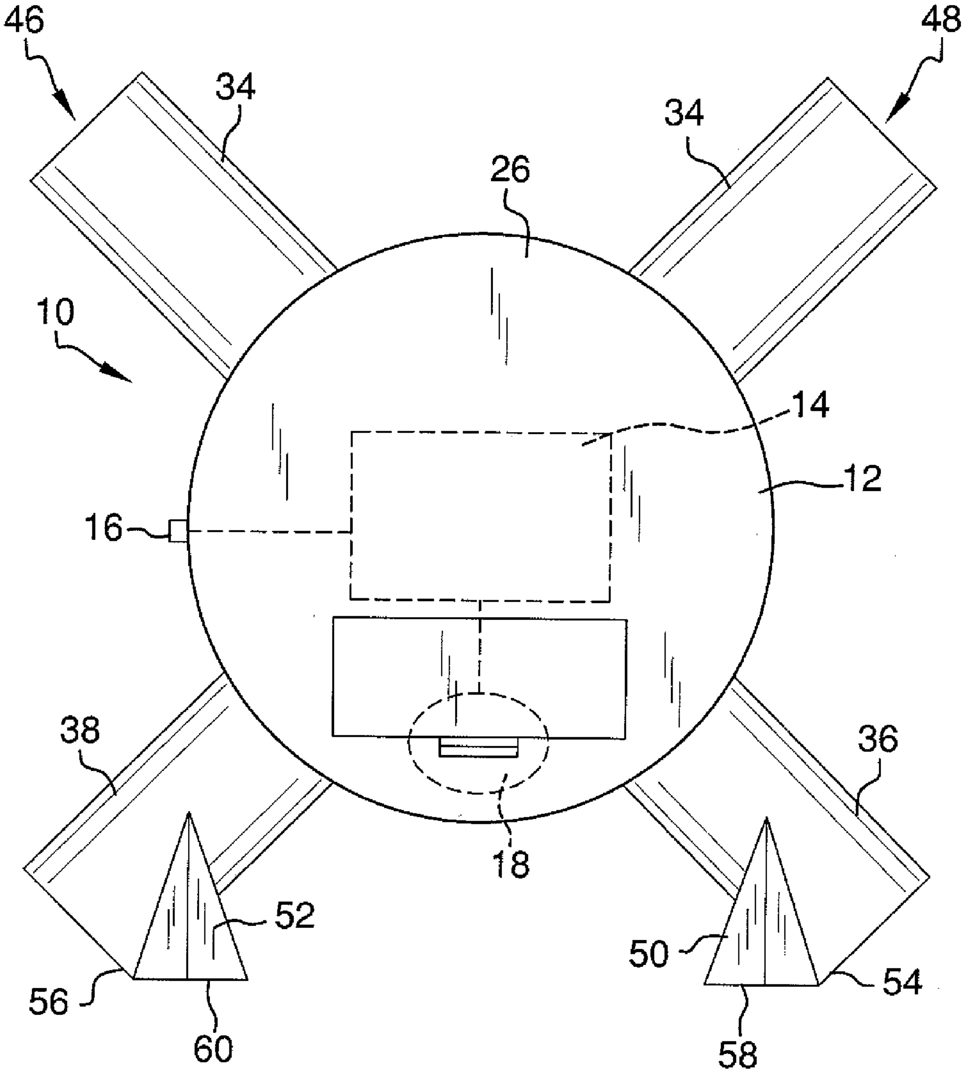
FIG. 3 is a back view of an embodiment of the disclosure.

With reference now to the drawings, and in particular to FIGS. 1 through 3 thereof, a new metronome device embodying the principles and concepts of an embodiment of the disclosure and generally designated by the reference numeral 10 will be described.

As best illustrated in FIGS. 1 through 3, the salsa metronome 10 generally comprises a housing 12 and a control unit 14 positioned in the housing 12. The control unit 14 produces multiple polyrhythmic sound patterns used in salsa music. A rhythm selection control 16 is coupled to the housing 12. The rhythm selection control 16 is operationally coupled to the control unit 14 for selecting a desired one of the polyrhythmic sound patterns. The sound patterns for salsa music include either a 2/3 or 3/2 clave pattern. A speaker 18 is positioned in the housing 12. The speaker 18 is operationally coupled to the control unit 14 for audibly producing the desired one of the polyrhythmic sound patterns. A plurality of aligned radial slots 84 extend through the housing 12. The aligned slots 84 are positioned adjacent to the speaker 18.

A tempo control 20 is also coupled to the housing 12. The tempo control 20 is operationally coupled to the control unit 14 for adjusting a tempo of the polyrhythmic sound patterns. The tempo control 20 may be a rotatable disc-shaped knob 22. A pointer 62 extends from the knob 22. A plurality of tempo indicators 64 is arranged radially around the knob 22. Each tempo indicator 64 corresponds to a selectable tempo and may include both a name 66 and beats per minute indication 68. The tempos available may include largo 70, larghetto 72, adagio 74, andante 76, moderato 78, allegro 80, and presto 82. The knob 22 is operationally coupled to the control unit 14 such that the pointer 62 points at the tempo indicator 64 corresponding to a tempo of the polyrhythmic sound pattern produced by the control unit 14.

A light 24 may be coupled to the housing 12. The light 24 is operationally coupled to the control unit 14. The light 24 illuminates periodically in synchronization with the desired one of the polyrhythmic sound patterns to provide a visual representation of the salsa clave pattern at the selected tempo.

The housing 12 has a central segment 26. The central segment 26 of the housing 12 has a front face 28, a rear face 30, and a perimeter wall 32 extending between the front face 28 and the rear face 30. A plurality of protruding segments 34 of the housing 12 extend outwardly from the perimeter wall 32 of the central segment 26. Each protruding segment 34 is cylindrical. The protruding segments 34 include a pair of lower protruding segments 36,38 and a pair of upper protruding segments 40,42. Each lower protruding segment 36,38 aligns with an opposed upper protruding segment 40,42 through a center 44 of the central segment 26. Thus, the lower protruding segment 36 and the opposed upper protruding segment 42 appear to be a single cylindrical member 46 extending through the central segment 26. Similarly, the lower protruding segment 38 and the opposed upper protruding segment 40 appear to be a single cylindrical member 48 extending through the central segment 26. A pair of base members 50,52 are provided. Each base member 50,52 is coupled to a distal end 54,56 of a respective one of the lower protruding segments 36,38 relative to the central segment 26. Each base member 50,52 also includes a planar bottom surface 58,60. The planar bottom surfaces 58,60 of the base members 50,52 are coplanar.

In use, the metronome 10 is used to provide a steady salsa beat to facilitate learning, practice, and playing of polyrhythmic sound patterns such as the 2/3 clave and 3/2 clave forming the basis for salsa and afro-cuban music. The desired sound pattern is selected using the rhythm selection control 16 and the desired tempo is set by turning the knob 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A polyrhythmic metronome assembly comprising:

a housing;

a control unit positioned in said housing, said control unit producing multiple polyrhythmic sound patterns;

a rhythm selection control coupled to said housing, said rhythm selection control being operationally coupled to said control unit for selecting a desired one of said polyrhythmic sound patterns;

a speaker positioned in said housing, said speaker being operationally coupled to said control unit for audibly producing said desired one of said polyrhythmic sound patterns;

a tempo control coupled to said housing, said tempo control being operationally coupled to said control unit for adjusting a tempo of said polyrhythmic sound patterns, said tempo control being a rotatable disc-shaped knob;

a light coupled to said housing, said light being operationally coupled to said control unit, said light illuminating periodically in synchronization with said desired one of said polyrhythmic sound patterns;

a central segment, said central segment of said housing having a front face, a rear face, and a perimeter wall extending between said front face and said rear face;

a plurality of protruding segments of said housing extending outwardly from said perimeter wall of said central segment, each said protruding segment being cylindrical, said protruding segments including a pair of lower protruding segments and a pair of upper protruding segments, each lower protruding segment aligning with an opposed upper protruding segment through a center of said central segment whereby a lower protruding segment and said opposed upper protruding segment appear to be a single cylindrical member extending through said central segment;

a pair of base members, each said base member being coupled to a distal end of a respective one of said lower protruding segments relative to said central segment, each said base member including a planar bottom surface, said planar bottom surfaces of said base members being coplanar;

a pointer extending from said knob;

a plurality of tempo indicators arranged radially around said knob, each tempo indicator corresponding to a selectable tempo, said knob being operationally coupled to said control unit such that said pointer points at a tempo indicator corresponding to a tempo of said desired one of said polyrhythmic sound pattern produced by said control unit; and a plurality of aligned radial slots extending through said housing, said aligned slots being positioned adjacent to said speaker.

* * * * *